(12) United States Patent
Endo

(10) Patent No.: US 10,288,993 B2
(45) Date of Patent: May 14, 2019

(54) WAVELENGTH CONVERSION MEMBER, WAVELENGTH CONVERSION ELEMENT, ILLUMINATOR, AND PROJECTOR

(71) Applicant: SEIKO EPSON CORPORATION, Tokyo (JP)

(72) Inventor: Takashi Endo, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/906,236

(22) Filed: Feb. 27, 2018

(65) Prior Publication Data

US 2018/0259834 A1   Sep. 13, 2018

(30) Foreign Application Priority Data

Mar. 7, 2017   (JP) .................................. 2017-042644

(51) Int. Cl.
*G03B 21/20*   (2006.01)
*G03B 33/12*   (2006.01)

(52) U.S. Cl.
CPC ............ *G03B 21/204* (2013.01); *G03B 33/12* (2013.01); *G03B 21/208* (2013.01); *G03B 21/2066* (2013.01)

(58) Field of Classification Search
CPC . G03B 21/204; G03B 21/2066; G03B 21/208
See application file for complete search history.

(56) References Cited

U.S. PATENT DOCUMENTS

2011/0116253 A1   5/2011   Sugiyama
2016/0268488 A1*  9/2016   Goeoetz ............. C09K 11/7774

FOREIGN PATENT DOCUMENTS

JP         2011-108535 A    6/2011

* cited by examiner

*Primary Examiner* — Anne M Hines
(74) *Attorney, Agent, or Firm* — Oliff PLC

(57) ABSTRACT

A wavelength conversion member formed of a single sintered body primarily made of a ceramic material has a first area and a second area having light emission characteristics different from each other.

20 Claims, 4 Drawing Sheets

WAVELENGTH CONVERSION MEMBER, WAVELENGTH CONVERSION ELEMENT, ILLUMINATOR, AND PROJECTOR

BACKGROUND

1. Technical Field

The present invention relates to a wavelength conversion member, a wavelength conversion element, an illuminator, and a projector.

2. Related Art

In recent years, there is a technology for producing light by using a phosphor layer in an illuminator for a projector. For example, in JP-A-2011-108535, to adjust the color of light outputted from an illuminator, the illuminator employs a phosphor wheel on which phosphor layers that emit different color light fluxes are coaxially arranged.

It is conceivable to combine a ceramic phosphor, which ensures high reliability, with the structure described above. In this case, however, the ceramic phosphor is bonded to a wheel substrate with an adhesive, and using two types of phosphor therefore requires two bonding steps, undesirably causing an increase in cost. Further, a space that allows the adhesive to flow out needs to be provided between the two types of phosphor. On the other hand, limitation in processing precision undesirably creates a space between the two members in some cases. The size of the wheel substrate therefore undesirably increases.

SUMMARY

An advantage of some aspects of the invention is to provide a wavelength conversion member formed only of a single sintered body but capable of emitting fluorescence having different tints. Another advantage of some aspects of the invention is to provide a wavelength conversion element including the wavelength conversion member. Another advantage of some aspects of the invention is to provide an illuminator including the wavelength conversion element. Another advantage of some aspects of the invention is to provide a projector including the illuminator.

According to a first aspect of the invention, a wavelength conversion member is provided. The wavelength conversion member is formed of a single sintered body primarily made of a ceramic material, and has a first area and a second area having light emission characteristics different from each other.

The wavelength conversion member according to the first aspect, which is formed only of a single sintered body, has the first area and the second area having light emission characteristics different from each other. Setting the area irradiated with excitation light as appropriate therefore allows the wavelength conversion member to produce fluorescence having different tints.

In the first aspect described above, it is preferable that the first area contains a first activator agent, and that the second area contains a second activator agent different from the first activator agent.

According to the configuration described above, the light emission characteristics in the first and second areas are allowed to differ from each other.

In the first aspect described above, it is preferable that the first and second activator agents are each selected from a group consisting of Ce, Eu, Cr, and Pr.

According to the configuration described above, the first and second areas are each allowed to have a desired light emission characteristic.

In the first aspect described above, it is preferable that the second area further contains a third activator agent.

According to the configuration described above, the first and second areas are each allowed to have a desired light emission characteristic.

In the first aspect described above, it is preferable that the first and second areas each contain a first activator agent, and that an amount of the first activator agent contained in the first area is greater than an amount of the first activator agent contained in the second area.

According to the configuration described above, causing the fluorescence emission characteristics of the first and second areas to differ from each other allows adjustment of the tint of the fluorescence.

In the first aspect described above, it is preferable that the first area has a first base material made of a plurality of elements, and that the second area has a second base material containing elements different from the plurality of elements.

According to the configuration described above, the fluorescence emission characteristics of the first and second areas are allowed to differ from each other.

In the first aspect of the invention, it is preferable that the first base material is made of YAG, and that the second base material is made of YAG part of which is replaced with at least one element selected from a group consisting of Gd, Ga, and Lu.

According to the configuration described above, causing the fluorescence emission characteristics in the first and second areas to differ from each other allows a desired fluorescence emission characteristic to be obtained.

According to a second aspect of the invention, a wavelength conversion element is provided. The wavelength conversion element includes the wavelength conversion member according to the first aspect described above and a substrate that supports the wavelength conversion member.

In the wavelength conversion element according to the second aspect, the wavelength conversion member can be bonded to the substrate with an adhesive in a single step, whereby the cost can be reduced. Further, since an adhesive flow-out space required in a case where two types of wavelength conversion member are bonded is not required, the size of the substrate can be reduced.

According to a third aspect of the invention, an illuminator is provided. The illuminator includes an excitation light source and the wavelength conversion element according to the second aspect described above.

The illuminator according to the third aspect, which includes the wavelength conversion element described above, allows cost and size reduction.

According to a fourth aspect of the invention, a projector is provided. The projector includes the illuminator according to the third aspect, a light modulator that modulates illumination light from the illuminator in accordance with image information to produce image light, and a projection system that projects the image light.

The projector according to the fourth aspect, which includes the illuminator that allows cost and size reduction, allows reduction in the cost of the projector.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
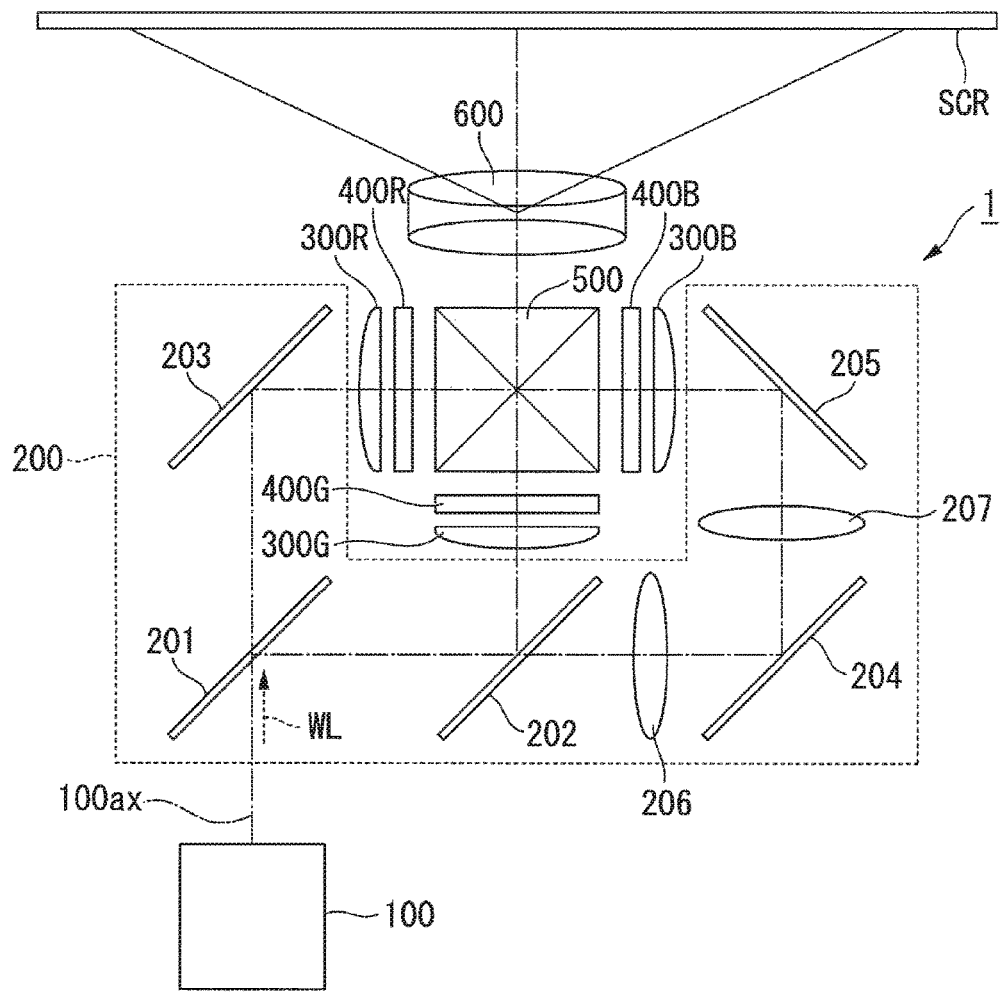
FIG. 1 is a schematic configuration diagram of a projector according to a first embodiment.

Embodiments of the invention will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

First Embodiment

An example of a projector according to an embodiment of the invention will first be described.

FIG. 1 shows a schematic configuration of the projector according to the present embodiment.

A projector 1 includes an illuminator 100, a color separation/light guide system 200, light modulators 400R, 400G, and 400B, a cross dichroic prism 500, and a projection system 600, as shown in FIG. 1.

In the present embodiment, the illuminator 100 outputs white light WL containing red light (R), green light (G), and blue light (B).

The color separation/light guide system 200 includes dichroic mirrors 201 and 202, reflection mirrors 203, 204, and 205, and relay lenses 206 and 207. The color separation/light guide system 200 separates the white light WL from the illuminator 100 into red light LR, green light LG, and blue light LB and guides the red light LR, the green light LG, and the blue light LB to the corresponding light modulators 400R, 400G, and 400B.

Field lenses 300R, 300G, and 300B are disposed between the color separation/light guide system 200 and the light modulators 400R, 400G, 400B.

The dichroic mirror 201 is a dichroic mirror that transmits a red light component and reflects a green light component and a blue light component. The dichroic mirror 202 is a dichroic mirror that reflects the green light component and transmits the blue light component. The reflection mirror 203 is a reflection mirror that reflects the red light component. The reflection mirrors 204 and 205 are reflection mirrors that reflect the blue light component.

The light modulators 400R, 400G, and 400B are each formed of a liquid crystal panel that modulates color light incident thereon in accordance with image information to form image light. The action mode of the liquid crystal panel is not limited to a specific mode and is, for example, the TN mode, the VA mode, or the lateral electric field mode.

Although not shown, light-incident-side polarizers are disposed between the field lenses 300R, 300G, 300B and the light modulators 400R, 400G, 400B, and light-exiting-side polarizers are disposed between the light modulators 400R, 400G, 400B and the cross dichroic prism 500.

The cross dichroic prism 500 combines the image light fluxes outputted from the light modulators 400R, 400G, and 400B with one another to form a color image.

The cross dichroic prism 500 is formed by bonding four rectangular prisms to each other and therefore has a roughly square shape in a plan view, and dielectric multilayer films are formed along the roughly X-letter-shaped interfaces between the bonded rectangular prisms.

The color image having exited out of the cross dichroic prism 500 is enlarged and projected by the projection system 600 on a screen SCR.

Illuminator

Figure 2:
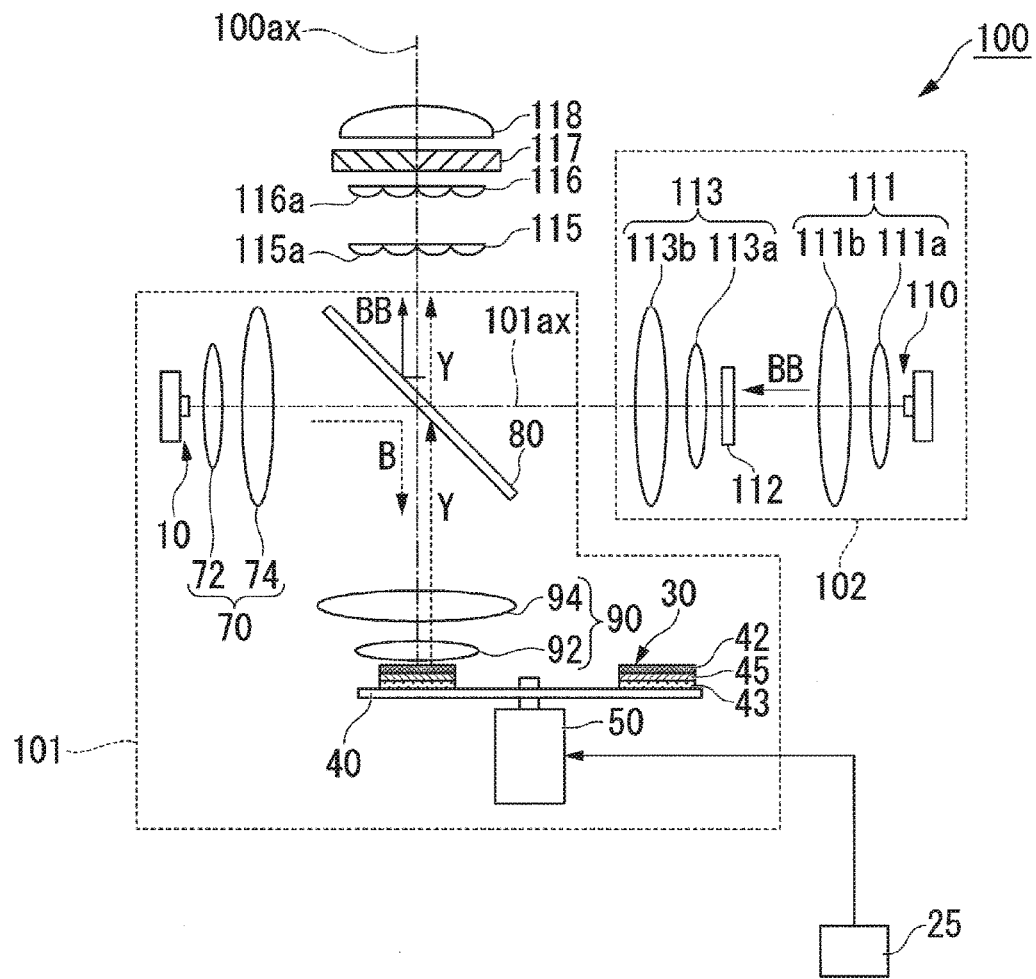
FIG. 2 is a plan view showing a schematic configuration of an illuminator.

FIG. 2 is a plan view showing a schematic configuration of the illuminator 100.

The illuminator 100 includes a first light source apparatus 101, a second light source apparatus 102, a first lens array 115, a second lens array 116, a polarization conversion element 117, and a superimposing lens 118, as shown in FIG. 2.

The first light source apparatus 101 includes a first light source 10, a wavelength conversion element 30, a collimation system 70, a dichroic mirror 80, and a collimation/light collection system 90.

The first light source 10 is so disposed that an optical axis 101ax thereof is perpendicular to an illumination optical axis 100ax. The first light source 10 is formed of a laser light source that emits blue light (light having emitted light intensity that peaks at about 445 nm, for example) B formed of a laser beam as excitation light.

The collimation system 70 includes a first lens 72 and a second lens 74 and roughly parallelizes the light from the first light source 10. The first lens 72 and the second lens 74 are each formed of a convex lens.

The dichroic mirror 80 is so disposed in the optical path from the collimation system 70 to the collimation/light collection system 90 as to intersect the optical axis of the first light source 10 and the illumination optical axis 100ax and incline with respect thereto by 45°. The dichroic mirror 80 reflects the blue light B and transmits the red light and green light.

The collimation/light collection system 90 has the function of causing the blue light B from the dichroic mirror 80 to be incident on a phosphor layer 42 (which will be described later) with the blue light B roughly collected and the function of roughly parallelizing fluorescence emitted from the phosphor layer 42. The collimation/light collection system 90 includes a first lens 92 and a second lens 94. The first lens 92 and the second lens 94 are each formed of a convex lens. The configuration of the wavelength conversion element 30 will be described later.

The second light source apparatus 102 includes a second light source 110, a light collection system 111, a scatter plate 112, and a collimation system 113.

The optical axis of the second light source 110 coincides with the optical axis 101ax of the first light source 10 and is perpendicular to the illumination optical axis 100ax. The second light source 110 is formed of a laser light source that emits blue light (light having emitted light intensity that peaks at about 460 nm, for example) BB formed of a laser beam.

The light collection system 111 includes a first lens 111a and a second lens 111b. The light collection system 111 collects the blue light BB from the second light source 110 in the vicinity of the scatter plate 112. The first lens 111a and the second lens 111b are each formed of a convex lens.

The scatter plate 112 scatters the blue light BB from the second light source 110 to form blue light BB having a light orientation distribution similar to that of fluorescence Y emitted from the wavelength conversion element 30. The scatter plate 112 can, for example, be a microlens array.

The collimation system 113 includes a first lens 113a and a second lens 113b and roughly parallelizes the light from the scatter plate 112. The first lens 113a and the second lens 113b are each formed of a convex lens.

The dichroic mirror 80 combines the blue light BB from the second light source apparatus 102 with the yellow fluorescence Y from the wavelength conversion element 30 to produce the white light WL.

The white light WL from the dichroic mirror 80 is incident on the first lens array 115.

The first lens array 115 includes a plurality of first lenslets 115a for dividing the light from the dichroic mirror 80 into a plurality of sub-light fluxes. The plurality of first lenslets 115a are arranged in a matrix in a plane perpendicular to the illumination optical axis 100ax.

The second lens array 116 includes a plurality of second lenslets 116a corresponding to the plurality of first lenslets 115a in the first lens array 115. The second lens array 116 along with the superimposing lens 118 forms images of the first lenslets 115a in the first lens array 115 in the vicinity of an image formation area of each of the light modulators 400R, 400G, and 400B, each of which is formed of a liquid crystal panel. The plurality of second lenslets 116a are arranged in a matrix in a plane perpendicular to the illumination optical axis 100ax.

The polarization conversion element 117 converts each of the divided sub-light fluxes from the first lens array 115 into linearly polarized light.

The polarization conversion element 117 has polarization separation layers that directly transmit one linearly polarized light component of the polarized light components contained in the light from the wavelength conversion element 30 and reflect another linearly polarized light component in the direction perpendicular to the illumination optical axis 100ax, reflection layers that reflect the other linearly polarized light component reflected off the polarization separation layers in the direction parallel to the illumination optical axis 100ax, and retardation films that convert the other linearly polarized light component reflected off the reflection layers into the one linearly polarized light component.

The superimposing lens 118 collects the sub-light fluxes from the polarization conversion element 117 and superimposes the sub-light fluxes on one another in the vicinity of the image formation area of each of the light modulators 400R, 400G, and 400B. The first lens array 115, the second lens array 116, and the superimposing lens 118 form an optical integration system that homogenizes the in-plane optical intensity distribution of the light from the wavelength conversion element 30.

The wavelength conversion element 30 includes a substrate 40 having a circular shape in a plan view, the phosphor layer 42, which is provided on one surface of the substrate 40 and along the circumferential direction of the substrate 40, and a motor 50. The phosphor layer 42 is bonded to the substrate 40 via an adhesive 43.

The wavelength conversion element 30 in the present embodiment is rotatable by the motor 50 connected to the center of the substrate 40. The wavelength conversion element 30 is what is called a reflective wavelength conversion element that emits red light and green light toward the side on which the blue light B is incident.

In the first light source apparatus 101, the blue light B from the first light source 10 is incident on the phosphor layer 42. A reflection film 45, which reflects visible light, is provided between the phosphor layer 42 and the substrate 40. The fluorescence Y therefore exits toward the side on which the blue light B is incident.

The phosphor layer 42 is excited with the blue light B having the wavelength of about 445 nm. The phosphor layer 42 converts the blue light B from the first light source 10 into the yellow fluorescence Y. The configuration of the phosphor layer 42 will be described later.

In the present embodiment, the wavelength conversion element 30 is so configured that the phosphor layer 42 is rotated along with the substrate 40. The position where the blue light B from the first light source 10 is incident on the phosphor layer 42 therefore moves in the radial direction of the phosphor layer 42.

In the present embodiment, the phosphor layer 42 is formed of a sintered body made of a ceramic material.

Figure 3:
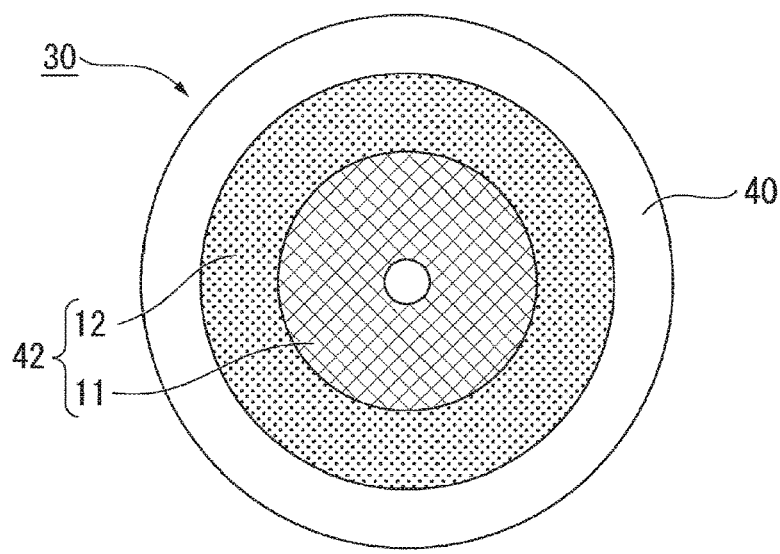
FIG. 3 is a plan view of a wavelength conversion element.

FIG. 3 is a plan view of the wavelength conversion element 30.

The phosphor layer 42 in the present embodiment has a first area 11 and a second area 12, as shown in FIG. 3. The first area 11 and the second area 12 have light emission characteristic different from each other and are integrated with each other. The first area 11 and the second area 12 integrated with each other means that they are joined to each other at the grain level.

In the present embodiment, the first area 11 and the second area 12 each have a ring shape and are coaxially arranged. The second area 12 is located outside the first area 11 in the radial direction.

The first area 11 has a base material made of a plurality of elements. Specifically, the first area 11 is made of Ce:YAG having $Y_3Al_5O_{12}$ (hereinafter referred to as "YAG") as the base material and containing Ce as a first activator agent. Ce:YAG is a yellow phosphor that highly efficiently emits yellow fluorescence when irradiated with the blue light B. The first area 11 is therefore preferably used in a brightness-oriented mode as the drive mode of the projector 1.

The first area 11 is made of Ce:YAG as a primary material and may contain $Ce:YAlO_3$ (Ce:YAP), $Ce:Y_2O_3$, and a plurality of pores.

A phosphor made of YAG has a light emission characteristic that changes in accordance with the type of activator agent. For example, Ce:YAG, which forms the first area 11, highly efficiently produces yellow fluorescence but tends to be short of red light. That is, the tint of the fluorescence produced by Ce:YAG tends to be greenish yellow.

In the present embodiment, providing the second area 12, which differs from the first area 11 in terms of light emission characteristic, allows a variable tint of the fluorescence produced by the phosphor layer 42.

The second area 12 is made of Ce,Eu:YAG having YAG as the base material and containing Eu as a second activator agent different from the first activator agent Ce and Ce as a third activator agent. Since the second area 12 has a light emission characteristic different from that of the first area 11, setting the area irradiated with the blue light B as appropriate allows the wavelength conversion member to produce fluorescence having different tints.

In the present embodiment, the second area 12 compensates for the shortage of the red portion of the spectrum of the fluorescence produced in the first area 11, whereby high-color-purity white light WL can be produced. The second area 12 is therefore preferably used in a tint-oriented mode as the drive mode of the projector 1 instead of the brightness-oriented mode.

The Eu-activated second area 12 has fluorescence emission efficiency lower than that of the first area 11 and therefore generates a greater amount of heat than the first area 11. The second area 12 is therefore disposed in a position shifted from the first area 11 in the radial direction of the phosphor layer 42. Since the second area 12 therefore has a large outer diameter, a temperature increase due to the blue light B can be suppressed.

The second and third activator agents are not limited to those described above and are adjusted as appropriate in accordance with the spectrum characteristic of fluorescence desired to be produced in the second area 12. For example, the third activator agent may be the same type as that of the first activator agent. The second activator agent is made of a material different from that of the first activator agent. In the present embodiment, the second activator agent is selected from the group consisting, for example, of Eu, Cr, and Pr. That is, the second area 12 may be made, for example, of Ce,Cr:YAG, Ce,Pr:YAG, Pr:YAG, Eu:YAG, or Cr:YAG.

The phosphor layer 42 in the present embodiment can be formed as follows: First, Ce:YAG is molded in a cylindrical shape. A layer made of Ce,Eu:YAG is then formed on the outer side of the Ce:YAG. The thus formed part is burned. The burned product is sliced into plate-shaped parts, which are each polished to produce the phosphor layer 42. Before the burning step, the material to which an organic binder is added may be degreased as required.

The first area 11 and the second area 12, which are made of the same base material (YAG), have the same hardness. Therefore, in the polishing described above, the first area 11 and the second area 12 can be polished together. The simplified polishing step allows reduction in manufacturing cost.

In the thus formed phosphor layer 42, the first area 11 and the second area 12 are joined to each other at the grain level. That is, the phosphor layer 42 is formed of a single sintered body primarily made of a ceramic material. The first area 11 and the second area 12 can therefore be handled as a single member. The phosphor layer 42 can therefore be bonded onto the substrate 40 via the adhesive 43 in a single step. The bonding step can therefore be simplified as compared with a case where two phosphor layers having different light emission characteristics are bonded to substrate 40.

In the case where the first area 11 and the second area 12 are not integrated with each other but are separate members, a space that allows the adhesive to flow out needs to be provided between the two members. On the other hand, limitation in processing precision undesirably creates a space between the two members in some cases. The size of the substrate 40 therefore undesirably increases by the size of the space, so does the cost. The phosphor layer 42 in the present embodiment, in which the first area 11 and the second area 12 are integrated with each other, does not create the space described above and can achieve cost and size reduction.

In the present embodiment, the wavelength conversion element 30 is movable by a driver 25 in the radial direction of the substrate 40. The wavelength conversion element 30 therefore allows the position where the blue light B is incident on the phosphor layer 42 to move along the radial direction of the substrate 40.

In the present embodiment, the position where the blue light B is incident on the phosphor layer 42 is switched between the first area 11 and the second area 12 in accordance with the position of the wavelength conversion element 30. For example, the driver 25 moves the wavelength conversion element 30 in such a way that the blue light B is incident on the first area 11 in the case where the brightness-oriented mode is selected as the drive mode of the projector 1. On the other hand, the driver 25 moves the wavelength conversion element 30 in such a way that the blue light B is incident on the second area 12 in the case where the tint-oriented mode is selected as the drive mode of the projector 1.

Further, causing the blue light B to be incident on the phosphor layer 42 in such a way that the area where the blue light B is incident contains both the first area 11 and the second area 12 allows the bright fluorescence produced by the first area 11 and the high-color-purity fluorescence produced by the second area 12 to be mixed with each other, whereby fluorescence having a balance between the brightness and the color purity can be produced.

According to the thus configured wavelength conversion element 30 in the present embodiment, the driver 25 can move the position where the blue light B is incident on the phosphor layer 42 to change the tint of the fluorescence Y emitted from the phosphor layer 42. Further, according to the illuminator 100 including the wavelength conversion element 30 and the projector 1 including the illuminator, a high-quality image corresponding to the drive mode can be displayed.

Second Embodiment

A wavelength conversion element according to a second embodiment will be subsequently described. Members and configurations common to those in the first embodiment have the same reference characters and will not be described in detail.

Figure 4:
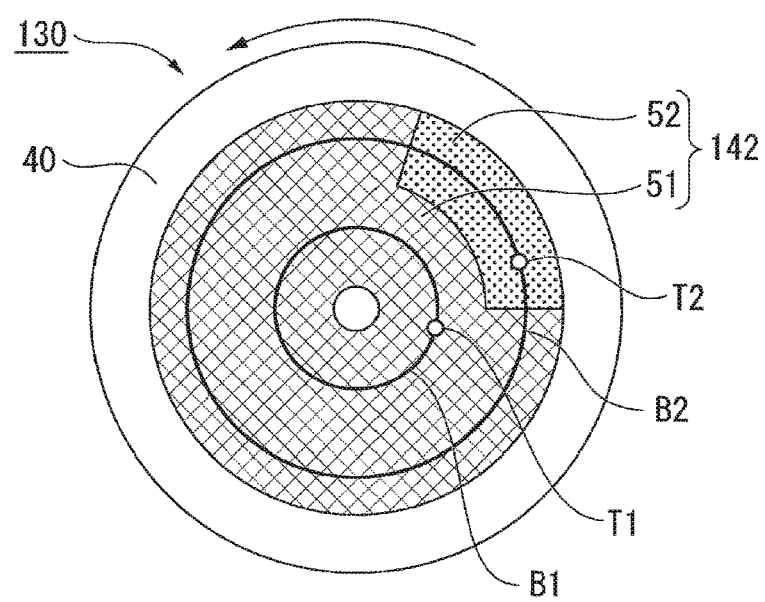
FIG. 4 is a plan view of a wavelength conversion element according to a second embodiment.

FIG. 4 is a plan view of a wavelength conversion element 130 according to the present embodiment. The wavelength conversion element 130 according to the present embodiment includes the substrate 40 having a circular shape in a plan view and a ring-shaped phosphor layer 142, which is provided on one surface of the substrate 40 and along the circumferential direction of the substrate 40, as shown in FIG. 4.

The phosphor layer 142 in the present embodiment has a first area 51 and a second area 52.

The second area 52 occupies the area corresponding not only to a circumferential part (about ⅕, for example) of the phosphor layer 142 but to a radial part (about radially outer of ½, for example) of the phosphor layer 142. The first area 51 occupies the remainder of the phosphor layer 142 or the area thereof excluding the second area 52.

In the present embodiment, the first area 51 is made of Ce:YAG having YAG as the base material and containing the first activator agent Ce.

In the present embodiment, the second area 52 is made of Eu:YAG having YAG as the base material and containing Eu as the second activator agent different from the first activator agent Ce. Since the second area 52 has a light emission characteristic different from that of the first area 51, setting the area irradiated with the blue light B as appropriate allows the wavelength conversion member to produce fluorescence having different tints. The second area 52 compensates for the shortage of the red portion of the spectrum of the fluorescence produced in the first area 51, whereby high-color-purity white light WL can be produced.

The fluorescence spectrum of Ce:YAG and the fluorescence spectrum of Eu:YAG overlap with each other. Therefore, in a case where the co-activation using Ce and Eu is employed, as in the second area 12 in the first embodiment, the fluorescence emitted from Ce:YAG could be absorbed again by Eu:YAG, which could emit fluorescence again. As a result, the fluorescence emission efficiency could decrease, or the spectrum of the fluorescence produced by Ce:YAG is deformed, so that a desired spectrum could not be obtained. The phosphor layer 142 in the present embodiment, which does not employ the co-activation, is unlikely to cause the problem described above.

Also in the present embodiment, the position where the blue light B is incident on the phosphor layer 142 is movable in the radial direction of the phosphor layer 142. When the blue light B is incident on a position T1 in FIG. 4, the trajectory B1 drawn by the blue light B on the phosphor layer 142 passes only through the first area 51. The fluorescence produced only by the first area 51 is therefore emitted. That is, fluorescence suitable for the brightness-oriented drive mode can be produced, as in the first embodiment.

On the other hand, when the blue light B is incident on a position T2 in FIG. 4, the trajectory B2 drawn by the blue light B on the phosphor layer 142 passes through the first area 51 and the second area 52. The fluorescence produced by the first area 51 and the fluorescence produced by the second area 52 are therefore sequentially emitted in accordance with the angle of rotation of the phosphor layer 142. Fluorescence containing both the fluorescence from the first area 51 and the fluorescence from the second area 52, which differs from the first area 51 in terms of light emission characteristic, can be produced by time-course averaging. Fluorescence having a tint different from that of the fluorescence produced only by the first area 51 can therefore be produced. That is, the bright fluorescence produced by the first area 51 and the high-color-purity fluorescence produced by the second area 52 can be mixed with each other, whereby fluorescence having a balance between the brightness and the color purity can be produced.

Third Embodiment

A phosphor layer according to a third embodiment will be subsequently described. Members and configurations common to those in the first embodiment have the same reference characters and will not be described in detail.

Figure 5:
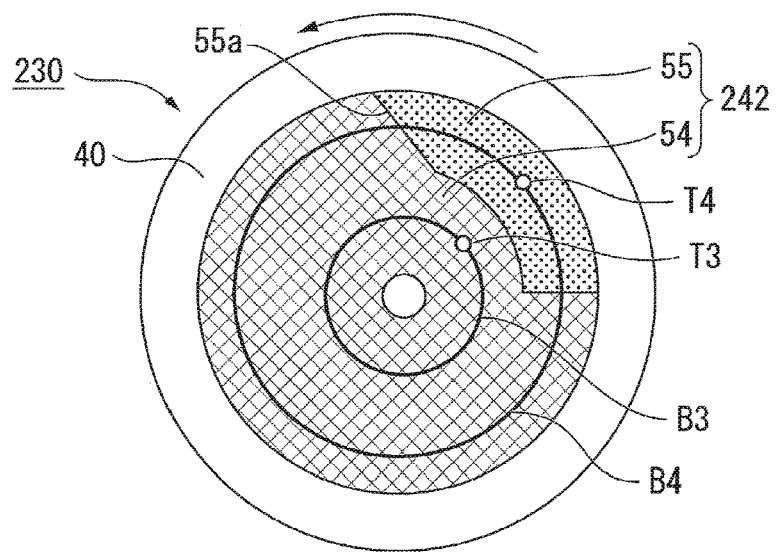
FIG. 5 is a plan view of a wavelength conversion element according to a third embodiment.

FIG. 5 is a plan view of a wavelength conversion element 230 according to the present embodiment. The wavelength conversion element 230 according to the present embodiment includes the substrate 40 having a circular shape in a plan view and a ring-shaped phosphor layer 242, which is provided on one surface of the substrate 40 and along the circumferential direction of the substrate 40, as shown in FIG. 5.

The phosphor layer 242 in the present embodiment has a first area 54 and a second area 55.

The second area 55 occupies the area corresponding not only to a circumferential part (about ⅕, for example) of the phosphor layer 22 but to a radial part (about radially outer of ½, for example) of the phosphor layer 242. The first area 54 occupies the remainder of the phosphor layer 242 or the area thereof excluding the second area 55.

In the phosphor layer 242 in the present embodiment, the boundary 55a between the first area 54 and the second area 55 intersects the radial direction. The ratio between the first area 54 and the second area 55 in the circumferential direction therefore varies in the radial direction of the phosphor layer 242.

In the present embodiment, the first area 54 is made of Ce:YAG having YAG as the base material and containing the first activator agent Ce. The second area 55 is made of Eu:YAG having YAG as the base material and containing the second activator agent Eu.

Also in the present embodiment, the position where the blue light B is incident on the phosphor layer 242 is movable in the radial direction of the phosphor layer 242. When the blue light B is incident on a position T3 in FIG. 5, the trajectory B3 drawn by the blue light B on the phosphor layer 242 passes only through the first area 54. The fluorescence produced only by the first area 54 is emitted. Fluorescence suitable for the brightness-oriented drive mode can therefore be produced.

On the other hand, when the blue light B is incident on a position T4 in FIG. 5, the trajectory B4 drawn by the blue light B on the phosphor layer 242 passes through the first area 54 and the second area 55. The fluorescence produced by the first area 54 and the fluorescence produced by the second area 55 are therefore sequentially emitted in accordance with the angle of rotation of the phosphor layer 242. Fluorescence containing both the fluorescence from the first area 54 and the fluorescence from the second area 55, which differs from the first area 54 in terms of light emission characteristic, can be produced by time-course averaging.

Since the ratio between the first area 54 and the second area 55 in the circumferential direction varies in the radial direction of the phosphor layer 242, moving the position T4 in the radial direction allows adjustment of the ratio between the bright fluorescence produced by the first area 54 and the high-color-purity fluorescence produced by the second area 55. Fluorescence having a balance between the brightness and the color purity can therefore be produced.

The invention is not limited to the contents of the embodiments described above and can be changed as appropriate to the extent that the change does not depart from the substance of the invention.

For example, in the embodiments described above, the configuration in which the motor 50 rotates the substrate 40 is presented as an example of the wavelength conversion element. Instead, a fixed wavelength conversion element having a configuration in which the substrate does not rotate may be employed. The fixed wavelength conversion element will be described below as variations.

First Variation

Figure 6:
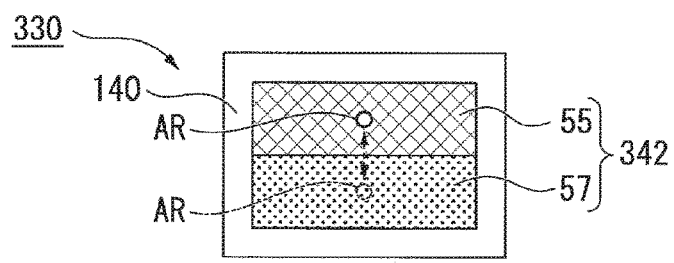
FIG. 6 is a plan view of a wavelength conversion element according to a first variation.

FIG. 6 is a plan view of a wavelength conversion element 330 according to the present variation. The wavelength conversion element 330 according to the present variation includes a substrate 140 and a phosphor layer 342 provided on one surface of the substrate 140, as shown in FIG. 6. An adhesive and a reflection layer (neither of them is shown) are provided between the substrate 140 and the phosphor layer 342.

The phosphor layer 342 in the present variation has a rectangular shape in a plan view and has a first area 56 and a second area 57.

The first area 56 is made of Ce:YAG having YAG as the base material and containing the first activator agent Ce. The second area 57 is made of Eu:YAG having YAG as the base material and containing the second activator agent Eu.

The driver 25 (see FIG. 2) moves the wavelength conversion element 330 in such a way that the position AR where the blue light B is incident moves between the first area 56 and the second area 57. The tint of the fluorescence Y emitted from the phosphor layer 342 can therefore be changed.

Second Variation

Figure 7:
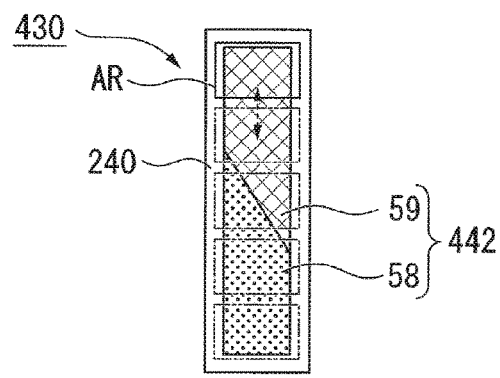
FIG. 7 is a plan view of a wavelength conversion element according to a second variation.

FIG. 7 is a plan view of a wavelength conversion element 430 according to the present variation. The wavelength conversion element 430 according to the present variation includes a substrate 240 and a phosphor layer 442 provided on one surface of the substrate 240, as shown in FIG. 7. A reflection layer and an adhesive layer (neither of them is shown) are provided between the substrate 240 and the phosphor layer 442.

The phosphor layer 442 in the present variation has a rectangular shape in a plan view and has a first area 58 and a second area 59. The second area 59 occupies an area having a trapezoidal shape that occupies part of the phosphor layer 442, and the first area 58 occupies the trapezoid-shaped remainder of the phosphor layer 442. The first area 58 and the second area 59 are in contact with each other along the inclining surfaces thereof.

The first area 58 is made of Ce:YAG having YAG as the base material and containing the first activator agent Ce. The second area 59 is made of Eu:YAG having YAG as the base material and containing the second activator agent Eu.

The wavelength conversion element 430 according to the present variation is movable by the driver 25 (see FIG. 2) in the direction in which the first area 58 and the second area 59 are disposed side by side, that is, the direction of the long edges of the phosphor layer 442, whereby an area AR on which the blue light B is incident can be moved in that direction.

In FIG. 7, the area AR on which the blue light B is incident has a rectangular shape, and the width of the area AR is roughly equal to the width of the short edges of the phosphor layer 442 for ease of description.

When the area AR, where the blue light B is incident on the phosphor layer 442, moves in the direction of the long edges of the phosphor layer 442, the ratio between the first area 58 and the second area 59 contained in the light incident area AR changes. The balance between the brightness and the color purity of the fluorescence Y produced in the area AR on which the blue light B is incident can therefore be adjusted.

The wavelength conversion element 430 according to the present variation, in which the area AR on which the blue light B is incident is moved in the direction in which the first area 58 and the second area 59 are disposed side by side, can produce desired fluorescence Y having an adjusted balance between the brightness and the color purity.

In the embodiments and variations described above, the case where the first area 11 is made of Ce:YAG is presented by way of example, but not necessarily in the invention. The first activator agent is not limited to Ce and can be adjusted as appropriate in accordance with an emitted light spectrum required for fluorescence desired to be produced in the first area 11. For example, the first activator agent may be selected from the group consisting of Eu, Cr, and Pr. That is, the first area 11 may be made, for example, of Pr:YAG, Eu:YAG, or Cr:YAG.

Further, in the embodiments and variations described above, the case where the first and second areas are made of the same base material (YAG) has been presented by way of example, but not necessarily in the invention. The second area may instead be made of a base material different from the base material (YAG) of the first area. In this case, the base material of the second area can be made of YAG part of which is replaced with at least one element selected from the group consisting, for example, of Gd, Ga, and Lu. For example, a phosphor layer having the first area made of Ce:YAG and the second area made of Ce: $(Y,Lu,Gd)_3(Al, Ga)_5O_2$ can be used.

Further, in the embodiments and variations described above, the phosphor layer having the first area containing the first activator agent and the second area containing the second activator agent different from the first activator agent has been presented by way of example, but not necessarily in the invention.

For example, the first and second areas may each contain the first activator agent. That is, the first and second areas may be made, for example, of Ce:YAG. In this case, it is desirable that the ion concentration of Ce contained in the first area (amount of first activator agent) is higher than the ion concentration of Ce contained in the second area. When the Ce ion concentration increases in Ce:YAG, the emitted light spectrum of the produced fluorescence is shifted toward the longer wavelength side. Therefore, even in the case where the first and second areas contain the same activator agent, setting the amounts of activator agent in the first and second areas at different values allows the fluorescence emission characteristics in the first and second areas to differ from each other, whereby the tint of the fluorescence can be adjusted.

In the embodiments described above, the projector 1 including the three light modulators 400R, 400G, and 400B is presented by way of example. The invention is also applicable to a projector that displays color video images via a single light modulator. Further, a digital mirror device may be used as each of the light modulators.

In the embodiments described above, the case where the illuminator according to any of the embodiments of the invention is incorporated in a projector is presented by way of example, but not necessarily. The illuminator according to any of the embodiments of the invention may be used for a lighting apparatus, a headlight of an automobile, and other apparatus.

The entire disclosure of Japanese Patent Application No. 2017-042644, filed on Mar. 7, 2017 is expressly incorporated by reference herein.

What is claimed is:

1. A wavelength conversion member, comprising:
    a first area that converts incident light to first emitted light; and
    a second area that converts the incident light to second emitted light of a different wavelength than the first emitted light, the first area and second area being directly joined at a grain level,
    wherein the wavelength conversion member is formed of a single sintered body primarily made of a ceramic material.

2. The wavelength conversion member according to claim 1,
    wherein the first area contains a first activator agent, and the second area contains a second activator agent different from the first activator agent.

3. The wavelength conversion member according to claim 2,
    wherein the first and second activator agents are each selected from a group consisting of Ce, Eu, Cr, and Pr.

4. The wavelength conversion member according to claim 2,
wherein the second area further contains a third activator agent.

5. The wavelength conversion member according to claim 1,
wherein the first and second areas each contain a first activator agent, and
an amount of the first activator agent contained in the first area is greater than an amount of the first activator agent contained in the second area.

6. The wavelength conversion member according to claim 1,
wherein the first area has a first base material made of a plurality of elements, and
the second area has a second base material containing elements different from the plurality of elements.

7. The wavelength conversion member according to claim 6,
wherein the first base material is made of YAG, and
the second base material is made of YAG part of which is replaced with at least one element selected from a group consisting of Gd, Ga, and Lu.

8. A wavelength conversion element comprising:
the wavelength conversion member according to claim 1; and
a substrate that supports the wavelength conversion member.

9. An illuminator comprising:
an excitation light source; and
the wavelength conversion element according to claim 8.

10. A projector comprising:
the illuminator according to claim 9;
a light modulator that modulates light from the illuminator in accordance with image information to produce image light; and
a projection system that projects the image light.

11. A wavelength conversion member, comprising:
a first area that contains a first activator agent; and
a second area that contains a second activator agent different from the first activator agent, the second area having light emission characteristics different from the first area,
wherein the wavelength conversion member is formed of a single sintered body primarily made of a ceramic material.

12. The wavelength conversion member according to claim 11, wherein at least one of the first activator agent and second activator agent is Cr.

13. The wavelength conversion member according to claim 11, wherein the second area further contains a third activator agent.

14. A wavelength conversion element comprising:
the wavelength conversion member according to claim 11; and
a substrate that supports the wavelength conversion member.

15. An illuminator comprising:
an excitation light source; and
the wavelength conversion element according to claim 14.

16. A projector comprising:
the illuminator according to claim 15;
a light modulator that modulates light from the illuminator in accordance with image information to produce image light; and
a projection system that projects the image light.

17. A wavelength conversion member, comprising:
a first area that contains a first activator agent; and
a second area that contains the first activator agent in a lesser amount than in the first area, the second area having light emission characteristics different from the first area,
wherein the wavelength conversion member is formed of a single sintered body primarily made of a ceramic material.

18. A wavelength conversion element comprising:
the wavelength conversion member according to claim 17; and
a substrate that supports the wavelength conversion member.

19. An illuminator comprising:
an excitation light source; and
the wavelength conversion element according to claim 18.

20. A projector comprising:
the illuminator according to claim 19;
a light modulator that modulates light from the illuminator in accordance with image information to produce image light; and
a projection system that projects the image light.

* * * * *